United States Patent [19]

Ito et al.

[11] Patent Number: 4,622,866
[45] Date of Patent: Nov. 18, 1986

[54] TRANSMISSION AND TRANSMISSION CONTROL DEVICE FOR PROVIDING DOWNSHIFTING

[75] Inventors: Hiroshi Ito; Shigemichi Yamada; Teruo Akashi, all of Toyota, Japan

[73] Assignee: Toyota Jidosha Kabushiki Kaisha, Toyota, Japan

[21] Appl. No.: 783,271

[22] Filed: Oct. 4, 1985

Related U.S. Application Data

[63] Continuation of Ser. No. 469,697, Feb. 25, 1983.

[30] Foreign Application Priority Data

Feb. 27, 1982 [JP] Japan ................... 57-31608

[51] Int. Cl.⁴ .............................................. B60K 41/06
[52] U.S. Cl. ................... 74/866; 74/336 R; 74/752 A; 192/48.6; 192/48.92; 364/424.1
[58] Field of Search ............ 74/866, 335, 336 R, 74/336.5, 337, 752 A, 752 D; 364/424.1; 192/0.052, 3.58, 48.4, 48.6, 48.92

[56] References Cited

U.S. PATENT DOCUMENTS

| 3,808,903 | 5/1974 | Sauer .................................. 74/335 |
| 4,262,335 | 4/1981 | Ahlen et al. ................... 74/752 DX |
| 4,311,062 | 1/1982 | Hamada et al. ................. 74/337 X |
| 4,442,727 | 4/1984 | Young ............................. 74/337 X |
| 4,566,348 | 1/1986 | Akashi et al. ..................... 74/359 |
| 4,576,063 | 3/1986 | Akashi et al. ..................... 74/745 |

FOREIGN PATENT DOCUMENTS

| 1222139 | 5/1958 | France ............................. 74/730 |
| 400221 | 11/1942 | Italy ............................... 74/330 |
| 56-164265 | 12/1981 | Japan ............................. 74/745 |
| 56-164229 | 12/1981 | Japan ........................... 192/48.92 |
| 57-1847 | 1/1982 | Japan ............................. 74/745 |
| 2064028 | 6/1981 | United Kingdom ............. 74/745 |
| 2069635 | 8/1981 | United Kingdom ............. 74/745 |

OTHER PUBLICATIONS

U.S. patent application Ser. No. 06/465,762, "Transmission Mechanism with Parallel Transmission Systems Including One Way Clutches, One Being Lockable", Akashi et al., filed Feb. 11, 1983.

Primary Examiner—Kenneth J. Dorner
Assistant Examiner—Dwight G. Diehl
Attorney, Agent, or Firm—Oblon, Fisher, Spivak, McClelland & Maier

[57] ABSTRACT

A method is described for controlling a vehicle transmission mechanism which incorporates several selectively engagable power transmission systems each being selectively individually connectable between a first member and a second member for transmitting rotational power between them, with each such power transmission system including a clutching mechanism which can be selectively controlled either to freewheel in both rotational directions or to provide direct transmission of rotational power in one rotational direction only and to freewheel in the other rotational direction. While a first one of the power transmission systems which is for providing a certain speed stage is connected between the first member and the second member for transmitting rotational power between them at a gearing ratio appropriate to that speed stage, a second one of the power transmission systems which is for providing the speed stage one lower than that certain speed stage is also individually connected in parallel with the first power transmission system, with the particular clutching mechanism associated with the second power transmission system being controlled to be able to provide direct transmission of rotational power in one rotational direction only and to freewheel in the other rotational direction. Thus, the clutching mechanism of the second power transmission system freewheels. When a downshift is required, the clutching mechanism of the first power transmission system is disengaged, and the second power transmission system takes over the power transmission. A device for practicing this method is also described.

4 Claims, 2 Drawing Figures

TRANSMISSION AND TRANSMISSION CONTROL DEVICE FOR PROVIDING DOWNSHIFTING

This application is a continuation of application Ser. No. 469,697, filed Feb. 25, 1983 now abandoned.

BACKGROUND OF THE INVENTION

The present invention relates to the field of transmission mechanisms for use in automatic gearboxes, and more particularly relates to a method for controlling a particular sort of transmission mechanism which provides various speed stages by use of several selectively engagable power transmission systems each of which is equipped with a clutching mechanism including a one way clutch, and a transmission control device for performing said control method.

There is a known type of transmission mechanism for providing various speed stages between a first rotating member and a second rotating member, which comprises several power transmission systems, each of which can selectively be engaged to provide transmission of rotational power at its own particular speed ratio (or typically any selectable one of a plurality of ratios) between the first and second members, and each of which has a clutching mechanism which either can be connected so as to thus transmit rotational power or can be disconnected so as not thus to transmit rotational power. By appropriately controlling the engagement and disengagement of the various clutching mechanisms, and concurrently controlling the selection of the various speed ratios of the various power transmission systems, which may be done automatically by a transmission control system of a per se well known type so as to provide entirely automatic operation, it is therefore possible to automatically shift between a plurality of speed stages and to provide both powered and engine braking operation of the transmission as a whole.

However, this prior art type of transmission mechanism has suffered from the disadvantage that its operation requires close and accurate control of the timing of the engagement and disengagement of the various clutching mechanisms. If the engagement of one of the clutching mechanisms occurs somewhat too late after the disengagement of the previously engaged transmission mechanism, then for a certain intermediate period the engine associated with the transmission will race, especially during a power on shift as during acceleration upshifting of the transmission or during a kick down type downshift, and this can damage various elements of the transmission mechanism; and on the other hand if the engagement of one of the clutching mechanisms occurs somewhat too early before the disengagement of the previously engaged transmission mechanism is complete, then for a short time period very large torsional strains are liable to be put on various elements of the transmission, in consequence of such an attempt, effectively, to engage two different speed ratios at one time, and this also can damage various elements of the transmission mechanism. Such a thusly necessitated close control of the timing of the engagement and disengagement of the various clutching mechanisms has presented a severe disadvantage with respect to the realization of an automatic transmission incorporating such a transmission mechanism, because such close timing control is very difficult to ensure, especially after the transmission has been used for a long period of time and its operational time constants have altered with usage. For example, in the case of a hydraulic type transmission control system, changes in the viscosity of the hydraulic fluid and changes in the size of the various orifices of the control system can cause timing difficulties. Especially, good timing control is important in the case of a power on downshift of the transmission or a so called kick down, when the engine load is high, and snappy and accurate shifting of the speed stages is particularly important and difficult in such a case, to provide good transmission operational feeling. If the responsiveness of the transmission during a power on downshift or a kick down type downshift is low, this amounts to the same thing as if the vehicle itself has poor acceleration characteristics, which is very disadvantageous.

Another factor that is required to be taken account of in the design of a transmission mechanism for an automatic transmission is mountability in a vehicle. In the case of a front engine front wheel drive type of vehicle there is present the constructional difficulty that the amount of axial space available for mounting the transmission has been very limited, which limits the axial length of the transmission as a whole.

Finally, it is almost a required characteristic of such a transmission mechanism that it should provide engine braking for the vehicle, at least in some of the speed stages thereof. Smooth starting off from rest of the vehicle, both forwards and backwards, are also very important, and it should not be necessary for unduly delicate control of the clutching mechanisms to be exerted in order to obtain this effect. Power loss in the transmission should be minimized. Further, within these above mentioned constraints, it is a general design objective of such an automatic transmission mechanism to be as light and compact as possible.

In a copending patent application Ser. No. 465,762, now U.S. Pat. No. 4,576,063, invented by the same inventors as the present invention and assigned to the same assignee, there are disclosed various embodiments of a novel type of transmission mechanism, in which there is proposed a transmission mechanism for a vehicle, for receiving input of rotational power from a power supplying member which rotates in a particular rotational direction and for outputting rotational power to a power receiving member, comprising: (a) a first member which is rotatably mounted and which receives supply of said rotational power from said power supplying member; (b) a second member which is rotatably mounted and which supplies rotational power to said power receiving member; and (c) a plurality of selectively engagable power transmission systems each being selectively individually connected between said first member and said second member for transmitting rotational power between said first member and said second member; (d) each one of said plurality of power transmission systems comprising a clutching mechanism which can be selectively controlled either to freewheel in both rotational directions and not to transmit power in either rotational direction or to provide direct transmission of rotational power in one rotational direction only and to freewheel in the other rotational direction, said one rotational direction being the one which is required for power transmission to be performed through said clutching mechanism, during the transmission of power from said power supplying member rotating in said particular rotational direction to said power receiving member via said one of said power transmission systems; (e) at least one of said clutching mechanisms being also selectively controllable so as to be locked up so as to transmit rotational power in both rotational directions.

According to such a structure, because each of the clutching mechanisms can be controlled to freewheel in the one rotational direction which is the opposite to the one which is required for power transmission to be performed through said clutching mechanism, in fact it is possible to have two of the power transmission systems, relating to two different speed stages of the transmission, engaged at the same time. No difficulty will arise with relation to the transmission becoming locked up, because of the free wheeling capability of the lower speed stage. Further, since one of the clutching mechanisms can be selectively locked up so as to transmit rotational power in both rotational directions, engine braking will be available in the speed stages which are made available by the power transmission system associated with this clutching mechanism, which conveniently may include the first and the reverse speed stages.

A requirement has arisen for a control method for controlling such a type of transmission mechanism, and for a device to perform the method, and in particular such a method and such a device which can take good advantage of the construction of such a transmission mechanism in order to provide good and snappy power on downshifting as during a kick down, as explained earlier.

SUMMARY OF THE INVENTION

Accordingly, it is the primary object of the present invention to provide a method and a device for controlling a transmission mechanism of the general sort described above, in which no particularly fine timing control of the clutching mechanisms is required in order to obtain proper shifting between speed stages.

It is a further object of the present invention to provide such a method and a device for controlling such a transmission mechanism, in which engine braking is available in at least some of the speed stages.

It is a further object of the present invention to provide a method and a device for controlling such a transmission mechanism, in which downshifting during high engine load conditions is carried out snappily and accurately.

It is a further object of the present invention to provide a method and a device for controlling such a transmission mechanism, in which downshifting during high engine load conditions is carried out without undue delay.

It is a further object of the present invention to provide a method and a device for controlling such a transmission mechanism, in which a power on downshift is conducted in such a way as to provide good vehicle acceleration.

It is a further object of the present invention to provide a method and a device for controlling such a transmission mechanism, in which a power on downshift is conducted in such a way as to provide good vehicle drivability and good transmission operational feeling.

It is a further object of the present invention to provide a method and a device for controlling such a transmission mechanism, in which power loss is minimized.

It is yet a further object of the present invention to provide a device for controlling such a transmission mechanism, which is cheap to manufacture.

According to the most general method aspect of the present invention, these and other objects relating to a method are accomplished by a method for controlling a transmission mechanism for a vehicle: said transmission mechanism being for receiving input of rotational power from a power supplying member which rotates in a particular rotational direction and for outputting rotational power to a power receiving member, and comprising: (a) a first member which is rotatably mounted and which receives supply of said rotational power from said power supplying member; (b) a second member which is rotatably mounted and which supplies rotational power to said power receiving member; and (c) a plurality of selectively engagable power transmission systems each being selectively individually connected between said first member and said second member for transmitting rotational power between said first member and said second member; (d) each one of said plurality of power transmission systems comprising a clutching mechanism which can be selectively controlled either to freewheel in both rotational directions and not to transmit power in either rotational direction or to provide direct transmission of rotational power in one rotational direction only and to freewheel in the other rotational direction, said one rotational direction being the one which is required for power transmission to be performed through said clutching mechanism, during the transmission of power from said power supplying member rotating in said particular rotational direction to said power receiving member via said one of said power transmission systems; (e) at least one of said clutching mechanisms being also selectively controllable so as to be locked up so as to transmit rotational power in both rotational directions: in which while a first one of said power transmission systems which is for providing a certain speed stage of said transmission mechanism is thus selectively individually connected between said first member and said second member for transmitting rotational power between said first member and said second member at a gearing ratio appropriate to said certain speed stage a second one of said power transmission systems which is for providing the speed stage of said transmission mechanism which is one speed stage lower than said certain speed stage is also individually connected in parallel with said first one of said power transmission systems between said first member and said second member for transmitting rotational power between said first member and said second member at a gearing ratio appropriate to said speed stage of said transmission mechanism which is one speed stage lower than certain speed stage, with the particular clutching mechanism associated with said second one of said power transmission systems being controlled to be able to provide direct transmission of rotational power in said one rotational direction only which is the one which is required for power transmission to be performed through said particular clutching mechanism, during the transmission of power from said power supplying member rotating in said particular rotational direction to said power receiving member via said second one of said power transmission systems; and to freewheel in the other rotational direction.

According to such a method, as a matter of course during the engagement of said certain speed stage, i.e. while the one of said clutching mechanisms associated with said first one of said power transmission systems is being engaged to provide direct transmission of rotational power in said one rotational direction only which is the one which is required for power transmission to be performed through said clutching mechanism, then said particular clutching mechanism associated with said second one of said power transmission systems will be freewheeling. Now, when it is desired to shift said transmission down from said certain speed stage to said speed stage which is one lower than said certain speed stage, then it is only necessary to disengage said one of said clutching mechanisms which is associated with said first one of said power transmission systems, and then said first member and said second member will remain as engaged together by said second one of said power transmission systems, and, in the case that this is a power on shift down or a so called kick down, the power supplying member, i.e. the crankshaft of the engine of the vehicle, will quickly speed up so as to drive the power receiving member, i.e. the input member of a differential device or the like of the vehicle, now at a gearing ratio appropriate to said speed stage which is one speed stage lower than said certain speed stage. This shift down is thus performed very snappily and smoothly and quickly, just be disengaging said particular clutching mechanism associated with said second one of said power transmission systems; and accordingly good vehicle acceleration and good drivability and transmission operational feeling are provided.

Further, according to a more particular method aspect of the present invention, these and other objects relating to a method are more particularly and concretely accomplished by a method for controlling a transmission mechanism as described above, wherein said second one of said power transmission systems which is for providing the speed stage of said transmission mechanism which is one speed stage lower than said certain speed stage is kept also individually connected in parallel with said first one of said power transmission systems between said first member and said second member, with said particular clutching mechanism associated with said second one of said power transmission systems being kept controlled to be able to provide direct transmission of rotational power in said one rotational direction only and to freewheel in the other rotational direction, substantially always while a shift down is operationally possible during the engagement of said certain speed stage of said transmission mechanism.

According to such a method, the transmission is kept ready for a quick downshift, substantially always while such a downshift is operationally envisageable. Thus quick vehicle acceleration is available at any time by a kick down process, with particularly snappy and responsive transmission shifting down action.

Further, according to the most general device aspect of the present invention, these and other objects relating to a device are accomplished by a device for controlling a transmission mechanism for a vehicle: said transmission mechanism being for receiving input of rotational power from a power supplying member which rotates in a particular rotational direction and for outputting rotational power to a power receiving member, and comprising: (a) a first member which is rotatably mounted and which receives supply of said rotational power from said power supplying member; (b) a second member which is rotatably mounted and which supplies rotational power to said power receiving member; and (c) a plurality of selectively engagable power transmission systems each being selectively individually connected between said first member and said second member for transmitting rotational power between said first member and said second member; (d) each one of said plurality of power transmission systems comprising a clutching mechanism which can be selectively controlled either to freewheel in both rotational directions and not to transmit power in either rotational direction or to provide direct transmission of rotational power in one rotational direction only and to freewheel in the other rotational direction, said one rotational direction being the one which is required for power transmission to be performed through said clutching mechanism, during the transmission of power from said power supplying member rotating in said particular rotational direction to said power receiving member via said one of said power transmission systems; (e) at least one of said clutching mechanisms being also selectively controllable so as to be locked up so as to transmit rotational power in both rotational directions: comprising: (a) sensors which detect operational parameters of said vehicle and which output sensor signals representative thereof; (b) effectors which are controlled by control signals and which according thereto control said plurality of power transmission systems and said clutching mechanisms; and (c) an electrical control device which receives input of said sensor signals from said sensors representative of said vehicle operational parameters, which based thereon decides on an appropriate speed stage of said transmission mechanism to be engaged and outputs said control signals to said effectors, and which, while it is controlling a first one of said power transmission systems which is for providing a certain speed stage of said transmission mechanism to be thus selectively individually connected between said first member and said second member for transmitting rotational power between said first member and said second member at a gearing ratio appropriate to said certain speed stage, also controls a second one of said power transmission systems which is for providing the speed stage of said transmission mechanism which is one speed stage lower than said certain speed stage to be also individually connected in parallel with said first one of said power transmission systems between said first member and said second member for transmitting rotational power between said first member and said second member at a gearing ratio appropriate to said speed stage of said transmission mechanism which is one speed stage lower than certain speed stage, and also controls the particular clutching mechanism associated with said second one of said power transmission systems to be able to provide direct transmission of rotational power in said one rotational direction only which is the one which is required for power transmission to be performed through said particular clutching mechanism, during the transmission of power from said power supplying member rotating in said particular rotational direction to said power receiving member via said second one of said power transmission systems, and to freewheel in the other rotational direction.

According to such a device, as a matter of course during the engagement of said certain speed stage, i.e. while said control device is controlling the one of said clutching mechanisms associated with said first one of said power transmission systems to be engaged to provide direct transmission of rotational power in said one rotational direction only which is the one which is required for power transmission to be performed through said clutching mechanism, then said particular clutching mechanism associated with said second one of said power transmission systems will be freewheeling. Now, when it is decided by said control system to shift said transmission down from said certain speed stage to said speed stage which is one lower than said certain speed stage, then it is only necessary for said control system to disengage said one of said clutching mechanisms which is associated with said first one of said power transmission systems, and then said first member and said second member will remain as engaged together by said second one of said power transmission systems, and, in the case that this is a power on shift down or a so called kick down, the power supplying member, i.e. the crankshaft of the engine of the vehicle, will quickly speed up so as to drive the power receiving member, i.e. the input member of a differential device or the like of the vehicle, now at a gearing ratio appropriate to said speed stage which is one speed stage lower than said certain speed stage. This shift down is thus performed very snappily and smoothly and quickly, just by said control system disengaging said particular clutching mechanism associated with said second one of said power transmission systems; and accordingly good vehicle acceleration and good drivability and transmission operational feeling are provided.

Further, according to a more particular device aspect of the present invention, these and other objects relating to a device are more particulary and concretely accomplished by a device for controlling a transmission mechanism as described above, wherein said control device keeps said second one of said power transmission systems which is for providing the speed stage of said transmission mechanism which is one speed stage lower than said certain speed stage also individually connected in parallel with said first one of said power transmission systems between said first member and said second member, and keeps said particular clutching mechanism associated with said second one of said power transmission systems controlled to be able to provide direct transmission of rotational power in said one rotational direction only and to freewheel in the other rotational direction, substantially always while a shift down is operationally possible during the engagement of said certain speed stage of said transmission mechanism.

According to such a device, the control device keeps the transmission ready for a quick downshift, substantially always while such a downshift is operationally envisageable. Thus quick vehicle acceleration is available at any time by a kick down process, with particularly snappy and responsive transmission shifting down action.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DETAILED DESCRIPTION OF THE PREFERRED EMBODIMENT

Figure 1:
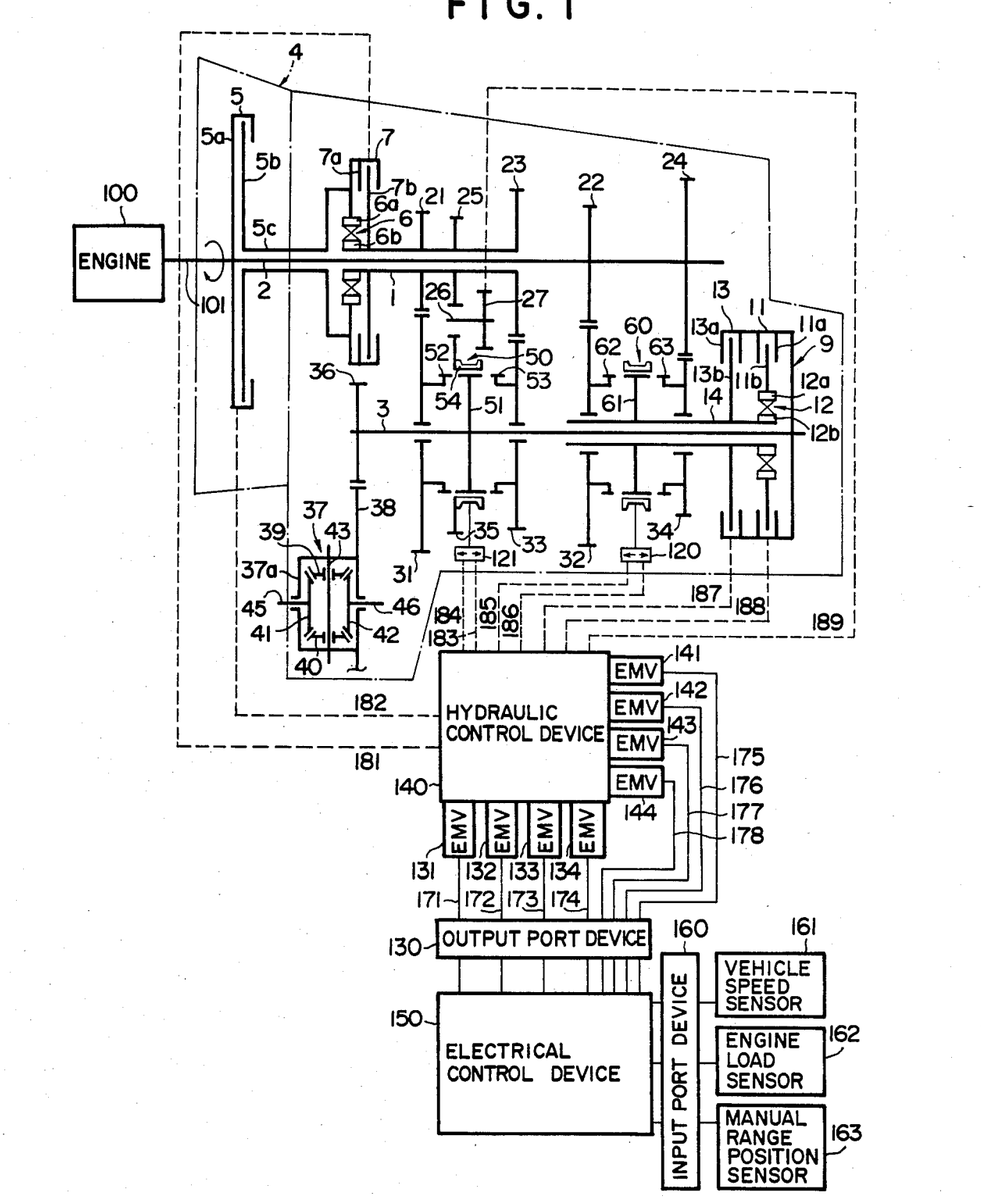
FIG. 1 is a schematic skeleton structural view of a transmission mechanism which is controlled by a transmission control device which is the preferred embodiment of the transmission control device of the present invention, according to the preferred embodiment of the transmission control method of the present invention, also showing in schematic form a differential device associated with said transmission mechanism.

The present invention will now be described with reference to the preferred embodiments of the transmission control method and device therof, and with reference to the appended drawings. FIG. 1 is a schematic skeleton structural view of a transmission mechanism which is controlled by the preferred embodiment of the transmission control device according to the present invention, according to the preferred embodiment of the transmission control method according to the present invention. In this figure, the reference numeral 100 denotes an internal combustion engine which is shown as a block, and 101 denotes the crankshaft of this engine 100, which is rotated thereby in one rotational direction only, hereinafter termed the predetermined rotational direction, so as to transmit output rotational power from said internal combustion engine 100. This crankshaft 101 is directly drivingly coupled to one end of a second driving gear wheel shaft 2, which extends through the transmission mechanism.

A first hollow driving gear wheel shaft 1 is coaxially rotatably mounted on the second driving gear wheel shaft 2 on its left end portion in the figure ("left", "right", "up", and "down" will be used in the sense of the relevant figure hereinafter), and the right hand end portion of the second driving gear wheel shaft 2 thus protrudes outwards to the right from this first hollow driving gear wheel shaft 1. Parallel with the first and second driving gear wheel shafts 1 and 2 and displaced therefrom there is provided a first driven gear wheel shaft 3, and a second hollow driven gear wheel shaft 14 is coaxially rotatably mounted on the second driving gear wheel shaft 2 on its right end portion in the figure.

Between the crankshaft 101 and the first hollow driving gear wheel shaft 1 there is provided a first clutching assembly 4. The function of this first clutching assembly 4 is that, according to selective control thereof exerted by a control system not shown in the drawing, between its rotational power input member and its rotational power output member, it can either: (a) provide freewheeling action in both rotational directions, not transmitting power in either rotational direction; or (b) provide direct transmission of rotational power in one rotational direction only, while it provides freewheeling action in the other rotational direction, said one rotational direction being the one which is required for power transmission to be performed through this first clutching assembly 4 in order to transmit power from the crankshaft 101, i.e., said predetermined rotational direction; or (c) provide direct transmission of rotational power in both rotational directions. This first clutching assembly 4 can operate in any one of these three operational modes.

The details of the construction of this first clutching assembly 4 are as follows. A first clutch 5 is provided, comprising a power input member 5a directly connected to the flywheel of the internal combustion engine 100 and thus directly rotationally connected to the crankshaft 101, and a power output member 5b rotationally connected to the left hand end of a hollow intermediate hollow shaft 5c (this shaft 5c may in fact simply be the hub portion of the power output member 5b) which is coaxially rotatably mounted on the second driving gear wheel shaft 2, to the left of the first driving gear wheel shaft 1. The right hand end of the intermediate hollow shaft 5c is rotationally connected to a power input member 6a of a first one way clutch 6, the power output member 6b of which is rotationally connected to the left hand end of the first driving gear wheel shaft 1; and said right hand end of the intermediate hollow shaft 5c is also rotationally connected to a power input member 7a of a second clutch 7, the power output member 7b of which is rotationally connected to the left hand end of the first driving gear wheel shaft 1.

Thus, the first clutch 5 is connected in series with the parallel combination of the first one way clutch 6 and the second clutch 7, and this series combination is connected between the engine crankshaft 101 and the first driving gear wheel shaft 1.

The more concrete construction of each of the clutches 5 and 7 is per se well known. Each of them is engaged to transmit rotational power therethrough when an actuating hydraulic fluid pressure is supplied to its fluid actuator, and is disengaged to allow its two relatively rotatable members to rotate freely relative to one another when no such hydraulic fluid pressure is provided to said fluid actuator. Also, the more concrete structure of the first one way clutch 6 is per se well known. Its input and output members are engaged to transmit rotational power therebetween in one relative rotational direction and are disengaged from one another to allow for their free relative rotation in the other relative rotational direction. Therefore, these constructions will not be further described herein.

Thus, the first clutching assembly 4 functions as follows. When the first clutch 5 and also the second clutch 7 are both engaged, the first clutching assembly 4 provides direct transmission of rotational power in both rotational directions. When the first clutch 5 is disengaged, irrespective of the engagement or disengagement condition of the second clutch 7, the first clutching assembly 4 provides freewheeling action in both rotational directions, not transmitting power in either rotational direction. When the first clutch 5 is engaged, but the second clutch 7 is disengaged, the first clutching assembly 4 provides direct transmission of rotational power in one rotational direction only, while it provides freewheeling action in the other rotational direction, said one rotational direction being the one which transmits power from the crankshaft 101 in said predetermined rotational directions towards a differential device 37 which will be discussed later.

This particular type of clutching assembly, consisting essentially of the series combination of a clutch and the parallel combination of a clutch and a one way clutch, with the above described three mode type function, will hereinafter be termed a series-parallel clutching assembly.

Between the second driven gear wheel shaft 14 and the first driven gear wheel shaft 3 there is provided a second clutching assembly 9. The function of this second clutching assembly 9 is also exactly the same type of three mode type function as that of the first clutching assembly 4. The details of the construction of this second clutching assembly 9 are, however, different from the construction of the first clutching assembly 4, and are as follows. A third clutch 11 is provided, comprising a power input member 11a rotationally connected to the second driven gear wheel shaft 14, and a power output member 11b rotationally connected to a power input member 12b of a second one way clutch 12, the power output member 12b of which is rotationally connected to the right hand end of the first driven gear wheel shaft 3. Thus, the third clutch 11 is connected in series when the second one way clutch 12, and this series combination is connected between the second driven gear wheel shaft 14 and the first driven gear wheel shaft 3. Further, a fourth clutch 13 is provided, comprising a power input member 13a rotationally connected to the second driven gear wheel shaft 14, and a power output member 13b rotationally connected to the right hand end of the first driven gear wheel shaft 3. The more concrete constructions of the third clutch 11 and of the fourth clutch 13 are per se well known. Further, the second one way clutch 12 is also per se well known, and these more concrete constructions will not be further described herein. The function of this second one way clutch 12, similarly to that of the first one way clutch 6, is that, when its power input member 12a is rotating in the aforesaid predetermined rotational direction, its power input member 12b is constrained to rotate in said predetermined rotational direction at least as quickly.

Thus, the second clutching assembly 9 functions as follows. When the the fourth clutch 13 is engaged, the second clutching assembly 9 provides direct transmission of rotational power in both rotational directions. When the fourth clutch 13 is disengaged, then when the third clutch 11 is disengaged the second clutching assembly 9 provides freewheeling action in both rotational directions, not transmitting power in either rotational direction. On the other hand, when the third clutch 11 is engaged, but the fourth clutch 13 is disengaged, the second clutching assembly 9 provides direct transmission of rotational power in one rotational direction only, while it provides freewheeling action in the other rotational direction, said one rotational direction being the one which transmits power from the crankshaft 101 towards the differential devic 37 in said predetermined rotational direction.

This particular type of clutching assembly, consisting essentially of the parallel combination of a clutch and the series combination of a clutch and a one way clutch, will hereinafter be termed a parallel-series clutching assembly.

On the first driven gear wheel shaft 3 there are rotatably mounted, in order from the left to the right in FIG. 1, a first speed driven gear 31 and a third speed driven gear 33. On the second driven gear wheel shaft 14 there are rotatably mounted, in order from the left to the right of FIG. 1, a second speed driven gear 32 and a fourth speed driven gear 34. On the first driving gear wheel shaft 1 there are fixedly mounted, in order from the left to the right in FIG. 1, a first speed driving gear 21, a reverse speed driving gear 25, and a third speed driving gear 23. On the portion of the second driving gear wheel shaft 2 which protrudes rightwards out of the first hollow driving gear wheel shaft 1 there are fixedly mounted, in order from the left to the right in FIG. 1, a second speed driving gear 22 and a fourth speed driving gear 24. The first speed driving gear 21 is in constant mesh with the first speed driven gear 31; the second speed driving gear 22 is in constant mesh with the second speed driven gear 32; the third speed driving gear 23 is in constant mesh with the third speed driven gear 33; and the fourth speed driving gear 24 is in constant mesh with the fourth speed driven gear 34.

Between the first speed driven gear 31 and the third speed driven gear 33 on the first driven gear wheel shaft 3 there is fitted a first/third synchronizer 50, which performs the function of synchronizing engagement of the first speed stage and of the third speed stage, as will be understood hereinafter. The first/third synchronizer 50 is of a per se well known sort, in fact being an inertia lock type Borg Warner synchromesh device. The first/third synchronizer 50 comprises a hub 51 which is fixedly mounted on the first driven gear wheel shaft 3, a set of first speed stage splines 52 provided integrally with the first speed driven gear 31 and a set of third speed stage splines 53 provided integrally with the third speed driven gear 33, and a first/third synchronizer sleeve 54 which is engaged by splines over the hub 51 so that it is rotationally coupled to the first driven gear wheel shaft 3 but is free to slide axially thereon, which is engagable to either the first speed stage splines 52 or the third speed stage splines 53, respectively according as to whether it is slid to the left or the right on said hub 51. The function of this first/third synchronizer 50 is to rotationally couple either the first speed driven gear 31 or the third speed driven gear 33 or neither of them to the first driven gear wheel shaft 3. On the outside of the first/third synchronizer sleeve 54 there is formed a reverse speed driven gear 35, the action of which will be explained later, which is substantially coplanar with the reverse speed driving gear 25 on the first driving gear wheel shaft 1.

Between the second speed driven gear 32 and the fourth speed driven gear 34 on the second driven gear wheel shaft 14 there is fitted a second/fourth synchronizer 60, which performs the function of synchronizing engagement of the second speed stage and of the fourth speed stage, as will be understood hereinafter. This second/fourth synchronizer 60 is also of a per se well known sort, in fact also being an inertia lock type Borg Warner synchromesh device. The second/fourth synchronizer 60 comprises a hub 61 which is fixedly mounted on the second driven gear wheel shaft 14, a set of second speed stage splines 62 provided integrally with the second speed driven gear 32 and a set of fourth speed stage splines 63 provided integrally with the fourth speed driven gear 34, and a second/fourth synchronizer sleeve 64 which is engaged by splines over the hub 61 so that is is rotationally coupled to the second driven gear wheel shaft 14 but is free to slide axially thereon, which is engagable to either the second speed stage splines 62 or the fourth speed stage splines 63, respectively according as to whether it is slid to the left or the right on said hub 61. The function of this second/fourth synchronizer 60 is to rotationally couple either the second speed driven gear 32 or the fourth speed driven gear 34 or neither of them to the second driven gear wheel shaft 14.

On the first driven gear wheel shaft 3 there is also fixedly mounted a power output gear wheel 36, which is in constant mesh with a differential power input ring gear 38 of a differential gear mechanism 37, which is of a per se well known sort. The differential gear mechanism 37 comprises a bevel gear case 37a to which said differential power input ring gear 38 is fixed so as to rotate said differential bevel gear case, and perpendicular to the rotational axis of the differential bevel gear case there is fixed a bevel gear shaft 43, on which there are rotatably mounted a pair of differential bevel gears 39 and 40. Also supported rotatably by the casing of the differential gear mechanism 37 as coaxial with the rotational axis of the differential bevel gear case there are provided left and right vehicle half shafts or axles 45 and 46, to the inner ends of which there are fixed a differential bevel gears 41 and 42, respectively. These differential bevel gears 41 and 42 are each in constant mesh with both of the differential bevel gears 39 and 40. The operation of such a differential mechanism as this differential gear mechanism 37 is per se well known.

Finally, on a reverse idler gear shaft 26 which is supported as parallel to the first and second driving gear wheel shafts 1 and 2 and the first driven gear wheel shaft 3 there is rotatably and slidably mounted a reverse idler gear 27. Arrangements of a per se well known sort, not shown in the figures, are provided for shifting this reverse idler gear 27 to and fro in the left and right directions on the reverse idler gear shaft 26; and, when the reverse idler gear 27 is in its most rightwards position on the reverse idler gear shaft 26, said reverse idler gear 27 does not mesh with any other gear wheels and is therefore free to rotate; but, when the reverse idler gear 27 is in its most leftwards position on the reverse idler gear shaft 26, said reverse idler gear 27 meshes with the reverse speed driving gear 25 and with the reverse speed driven gear 35 formed on the outside of the first/third synchronizer sleeve 54, so as to provide a reverse speed stage, as will be explained later.

The engagement conditions of each of the first, second, third, and fourth clutches 5, 7, 11, and 13, the positions of the first/third synchronizer sleeve 54 of the first/third synchronizer 50 and of the second/fourth synchronizer sleeve 64 of the second/fourth synchronizer sleeve 60, the position of the reverse idler gear 27 on the reverse idler gear shaft 26, and the engaged or over running conditions of the first and second one way clutches 6 and 12, will now be explained, during the engagement of each of the speed stages which can be provided by the transmission mechanism explained above, i.e. during the engagement of the neutral speed stage, the first forward speed stage, the second forward speed stage, the third forward speed stage, the fourth forward speed stage, and the reverse speed stage; and also the sequences of shifting and of engagement and disengagement operations of these means which are employed in the various possible operations of shifting between these speed stages will be explained. This explanation will be made with reference to Table I, which is located at the end of this specification and before the claims appended thereto, and which is to be understood as incorporated into this specification at this point.

In Table I, there is shown, for each of the transmission speed stages that can be attained, the engagement conditions of the first, second, third and fourth clutches, 5, 7, 11, and 13, the engagement or disengagement conditions of the first speed stage splines 52 and the third speed stage splines 53 to the first/third synchronizer sleeve 54 of the first/third synchronizer 50 and the engagement or disengagement conditions of the second speed stage splines 62 and the fourth speed stage splines 63 to the second/fourth synchronizer sleeve 64 of the second/fourth synchronizer 60, and the engaged or over running conditions of the first and second one way clutches 6 and 12, in this particular transmission mechanism. In this Table, the symbol "E" indicates that the corresponding mechanism, i.e. the corresponding clutch or spline and sleeve mechanism, is engaged, while and that this engagement is actually being used for transmission of rotational power; the symbol "D" indicates that the corresponding mechanism is disengaged; the symbol "e" indicates that the corresponding clutch or spline and sleeve mechanism is or may be engaged, but that this engagement is not actually currently being utilized, for instance since transmission of rotational power by the transmission is in any case ensured by the engagement of some other device which is provided in parallel with said clutch or spline and sleeve mechanism; the symbol "B", when used with relation to the clutches 7 and 13 (only), indicates that the corresponding one of these clutches 7 and 13 is to be engaged when engine braking is required, as for example when the accelerator pedal is released; the symbol "A" indicates that the corresponding one way clutch is engaged, when the internal combustion engine 100 is urging the automotive vehicle along the road, i.e. in engine drive state; and the symbol "O" indicates that the corresponding one way clutch is disengaged, when the internal combustion engine 100 is urging the automotive vehicle along the road, i.e. in engine drive state.

Now the operation of the transmission mechanism shown in FIG. 1 will be explained. In this connection, it should be understood that selective engagement and disengagment of the first, second, third and fourth clutches 5, 7, 11, and 13, which may be performed according to selective supply or non supply of actuating hydraulic fluid pressure to pressure chambers thereof or in some other manner, according to the details of the construction, is suitably performed according to operational parameters of the vehicle comprising this transmission mechanism by a control system for the transmission mechanism which is the preferred embodiment of the transmission control device according to the present invention, according to the preferred embodiment of the transmission control method according to the present invention; and this control system will be described later in this specification both with regard to its construction and with regard to the manner in which it performs its functions. The movements leftwards and rightwards of the first/third synchronizer sleeve 54 of the first/third synchronizer 50, of the second/fourth synchronizer sleeve 64 of the second/fourth synchronizer 60, and of the reverse idler gear 27 on the reverse idler gear shaft 26, are also suitably selectively performed by this control system, according to operational parameters of the vehicle of which this gear transmission mechanism forms part, and this aspect of said control system will also be explained hereinafter. Thus, for the movement, only the function of the transmission control system will be discussed, not its detailed structure.

NEUTRAL SPEED STAGE

In the neutral speed stage, which is schematically illustrated in FIG. 1, the clutches 5, 7, 11, and 13 are all disengaged. At this time the second/fourth synchronizer sleeve 64 of the second/fourth synchronizer 60 is set to its intermediate position by the control system, and the first/third synchronizer sleeve 54 of the first/third synchronizer 50 may also be set to its intermediate position by the control system, or as a preparatory step to engaging first speed stage said first/third synchronizer sleeve 54 may be shifted to the left in FIG. 1 so as to engage with the splines 52 for first speed stage, according to the planning inherent in the operation of the control system. Because the clutches 5, 7, 11, and 13 are none of them engaged, i.e. because the first and second clutching assemblies 4 and 9 are both in their completely disengaged states, the first driving gear wheel shaft 1 is not being driven by the internal combustion engine 100, but on the contrary is free, and accordingly no rotational force is being supplied therefrom to the first driven gear wheel shaft 3; and further said first driven gear wheel shaft 3 is not being driven from the second driven gear wheel shaft 14 via the second clutching assembly 9; and accordingly no rotational power is being transmitted to the differential mechanism 37. Thus the gear transmission mechanism functions in its neutral speed stage.

SHIFTING FROM NEUTRAL TO THE FIRST SPEED STAGE

In order to shift from the neutral speed stage into the first speed stage and to start the vehicle off from rest, first, as a preparatory action as mentioned above, the first/third synchronizer sleeve 54 of the first/third synchronizer 50 is moved to its leftwardly displaced position by the above mentioned transmission control system, if it is not there already, so as rotationally to couple the first speed driven gear wheel 31 with the first driven gear wheel shaft 3. No drive is yet transmitted at this time, because the first clutch 5 is still disengaged. Next, the first clutch 5 is smoothly engaged, while keeping the second clutch 7, the third clutch 11, and the fourth clutch 13 still disengaged. At this time, rotational power is transmitted from the crankshaft 101 through the first clutch 5 and the first one way clutch 6 to the first driving gear wheel shaft 1; but no rotational power is transmitted from the second driving gear wheel shaft 14 to the first driven gear wheel shaft 3, because the third clutch 11 remains disengaged, and because also the fourth clutch 13 remains disengaged. Thus, from the first driving wheel shaft 1, this rotational power is transmitted via the first speed driving gear 21 to the first speed driven gear 31 in constant mesh therewith which transmits said rotation via the splines 52 and the sleeve 54 of the first/third synchronizer 50 engaged thereto to the first driven gear wheel shaft 3, which rotates the power output gear wheel 36, thus transmitting output rotational power to the differential gear mechanism 37. Thus the vehicle is driven away from rest and operates in the first speed stage.

If, during running in the first speed stage, engine braking is currently required, for example when the accelerator pedal of the vehicle is released, then the second clutch 7 is engaged, while otherwise it is disengaged. If the second clutch 7 is engaged in engine overrunning condition, so as to bypass the action of the first one way clutch 6, rotational power can be transmitted in the reverse direction to the one described above via this second clutch 7 from the differential mechanism 37 to the crankshaft 101 in order to provide engine braking, and otherwise during engine overrunning condition the first one way clutch 6 runs free or overruns, thus not providing any engine braking and allowing the vehicle to free wheel or coast.

During steady running in the first speed stage the second/fourth synchronizer sleeve 64 of the second/fourth synchronizer 60 is set to its intermediate position by said control system, so that neither the second speed driven gear wheel 32 nor the fourth speed driven gear wheel 34 is rotationally connected to the second driven gear wheel shaft 14; however, as a preparatory action to engaging the second speed stage, in other words as a preparatory action to shifting up by one speed stage, in fact the second/fourth synchronizer sleeve 64 may be set to its leftwardly displaced position in FIG. 1 by the above mentioned transmission control system, so as rotationally to couple the second speed driven gear wheel 32 with the second driven gear wheel shaft 14. This will cause no particular operational problem, because at this time the third clutch 11 and the fourth clutch 13 are still disengaged.

Thus the gear transmission mechanism functions in its first speed stage. By the way, the shifting from the first speed stage to the neutral speed stage is accomplished simply by disengaging the first clutch 5 (and the second clutch 7 if it is engaged), and by returning the first/third synchronizer 50 and the second/fourth synchronizer 60 to their intermediate or disengaged positions, if either of them is not there yet.

UPSHIFTING FROM FIRST SPEED STAGE TO SECOND SPEED STAGE

In order to shift up from the first speed stage into the second speed stage, first, as a preparatory action as mentioned above, according to the planning inherent in the operation of the control system, the second/fourth synchronizer sleeve 64 of the second/fourth synchronizer 60 is moved to its leftwardly displaced position by the transmission control system, so as rotationally to couple the second speed driven gear wheel 32 with the second driven gear wheel shaft 14. No drive is yet transmitted at this time, because the third clutch 11 (and of course the fourth clutch 13 also) is still disengaged. Further, also as a preparatory action, the second clutch 7 is disengaged, if in fact it was previously engaged. Next, in order to actually perform the upshift, which of course will be during an engine drive condition and not during an engine overrunning condition, the third clutch 11 is smoothly engaged, while keeping the second clutch 7 still disengaged. As will be shortly explained, it is not necessary yet at this time to disengage the first clutch 5, and hence no particular complicated mutual control of the first clutch 5 and the third clutch 11 is required for the upshifting.

As the third clutch 11 becomes engaged, rotational power which is being transmitted from the crankshaft 101 to the second driving gear wheel shaft 2 and which is being transmitted via the second speed driving gear 22 to the second speed driven gear 32 engaged therewith which transmits said rotation via the splines 62 and the second/fourth synchronizer 60 engaged thereto to the second driven gear wheel shaft 14 starts to be transmitted through the third clutch 11 and the second one way clutch 12 to the first driven gear wheel shaft 3, which rotates the power output gear wheel 36, thus transmitting output rotational power to the difficult gear mechanism 37; and at this time automatically the first one way clutch 6 starts to run free or overrun, since as will be easily understood by one of ordinary skill in the transmission art based upon the foregoing explanation the rotational speed (in the predetermined rotational direction) of its power input member 6a now becomes less relative to the rotational speed of its power output member 6b. Accordingly no question of locking up of the transmission can occur, provided that the second clutch 7 is definitely disengaged before the third clutch 11 starts to be engaged to start the upshifting. Thus the vehicle comes to operate in the second speed stage. At a convenient time, during steady running in the second speed stage, when it is certain that a downshift back to the first speed stage is not imminently going to occur, the first/third synchronizer sleeve 54 of the first/third synchronizer 50 may be returned to the intermediate position, so as to stop the first one way clutch 6 free wheeling and so as to preserve the life of said first one way clutch 6; and also the first clutch 5 is disengaged; but this returning of the sleeve 54 is not actually urgent.

If, during running in the second speed stage, engine braking is currently required, for example when the accelerator pedal of the vehicle is released, then the fourth clutch 13 is engaged, while otherwise it is disengaged. If the fourth clutch 13 is engaged in engine overrunning condition, so as to bypass the action of the second one way clutch 12, rotational power can be transmitted in the reverse direction to the one described above via this fourth clutch 13 from the differential mechanism 37 to the crankshaft 101 in order to provide engine braking, and otherwise during engine overrunning condition the second one way clutch 12 runs free or overruns, thus not providing any engine braking and allowing the vehicle to free wheel or coast.

Further, during running in the second speed stage in a vehicle operational condition in which upshifting to the third speed stage and downshifting to the first speed stage are alike inconceivable, the synchronizer sleeve 54 of the first/third synchronizer 50 is set to its intermediate position by said control system, so that neither the first speed driven gear wheel 31 nor the third speed driven gear wheel 33 is rotationally connected to the first driven gear wheel shaft 3; however, when the vehicle is operating in an operational region in which an upshift is imminent or is conceivably imminent as a preparatory action to engaging the third speed stage in fact the first/third synchronizer sleeve 54 is set to its rightwardly displaced position by the above mentioned transmission control system, so as rotationally to couple the third speed driven gear wheel 33 with the first driven gear wheel shaft 3. On the other hand, when the vehicle is operating in an operational region in which a downshift is possible as a preparatory action to engaging the third speed stage in fact the first/third synchronizer sleeve 54 is set to its leftwardly displaced position by the above mentioned transmission control system, so as rotationally to couple the first speed driven gear wheel 31 with the first driven gear wheel shaft 3. The first one of these actions (relating to upshifting) does not cause any particular operational problem, because at this time the first clutch 5 is still disengaged; and the second one of these actions which relates to the case of a downshift to first speed stage does not cause any problem either, because in any case the first one way clutch 6 can operate to run free, even though as explained shortly the first clutch 5 is kept engaged.

DOWNSHIFTING FROM SECOND SPEED STAGE TO FIRST SPEED STAGE

As explained above, during steady running in the second speed stage the first/third synchronizer sleeve 54 of the first/third synchronizer 50 is kept at its intermediate position by said control system, so that neither the first speed driven gear wheel 31 nor the third speed driven gear wheel 33 is rotationally connected to the first driven gear wheel shaft 3; however, in any operational condition in which, by a kick down or the like, it is possible that the first speed stage may be downshifted to from the second speed stage, the first/third synchronizer 50 is set to its leftwardly displaced position by the transmission control system, so as rotationally to couple the first speed driven gear wheel 31 with the first driven gear wheel shaft 3. This will cause no particular operational problem, because at this time the first clutch 5 is still disengaged. Also as a preparatory action, with of course the second clutch 7 disengaged, the first clutch 5 is kept engaged. As before, as explained above, this will cause the first one way clutch 6 to run free or overrun.

Next, in order to actually perform the downshift, which may either be during engine drive condition in the case of a kick down type downshift or may be during engine overrunning condition in the case of an engine braking desirable type downshift, simply the third clutch 11 is smoothly disengaged, and the fourth clutch 13 is disengaged if it is engaged, while keeping the second clutch 7 still disengaged. Since at this time the first clutch 5 is already engaged, hence no particular complicated mutual control of the first clutch 5 and the third clutch 11 is required for the downshifting. Further, the downshift is very snappy and quick.

As the third clutch 11 becomes disengaged, if this is a case of a kick down type downshift, then the rotational speed of the internal combustion engine 100 will quickly increase to a rotational speed at which the first one way clutch 6 will stop running free, so that now rotational power starts to be transmitted from the crankshaft 101 through the first clutch 5 and the first one way clutch 6 to the first driving gear wheel shaft 1, and thence via the first speed driving gear 21 to the first speed driven gear 31 engaged therewith which transmits said rotation via the splines 52 and the first/third synchronizer 50 engaged thereto to the first driven gear wheel shaft 3, which rotates the power output gear wheel 36, thus transmitting output rotational power to the differential gear mechanism 37, now at a gearing ratio appropriate to the first speed stage.

On the other hand, as the third clutch 11 becomes disengaged, if this is not a case of a kick down type downshift, but is a case of a power off type downshift, then at this time automatically the first one way clutch 6 continues to run free or overrun, and the vehicle is allowed to free wheel or coast. Now, if engine braking is required after the downshift to the first speed stage, which typically will be the case in the case of a power off type downshift, then the bypass clutch 7 which bypasses the first one way clutch 6 is smoothly engaged, and accordingly the coasting or free running operational condition of the vehicle is quickly transformed into an engine braking condition. The ability to provide engine braking in the first speed stage is a consequence of the provision of the bypass clutch 7, i.e. is a consequence of the capability of the first clutching assembly 4 to be locked up in both rotational directions.

Thus the vehicle comes to operate in the first speed stage. At a convenient time, during steady running in the first speed stage, the synchronizer sleeve 64 of the second/fourth synchronizer 60 may be returned to the intermediate position, so as to stop the third clutch 11 from slipping and so as to preserve the life of said third clutch 11.

UPSHIFTING FROM SECOND SPEED STAGE TO THIRD SPEED STAGE

In order to shift up from the second speed stage into the third speed stage, first, as a preparatory action as mentioned above, the synchronizer sleeve 54 of the first/third synchronizer 50 is moved to its rightwardly displaced position by the transmission control system, so as rotationally to couple the third speed driven gear wheel 33 with the first driven gear wheel shaft 3. No drive is yet transmitted at this time, because the first clutch 5 is still disengaged. Next, in order to actually perform the upshift, which of course will be during engine drive condition and not during an engine overrunning condition, the first clutch 5 is smoothly engaged, while keeping the third clutch 11 still engaged, and after of course disengaging the fourth clutch 13 if it was engaged previously. It is not necessary yet at this time to disengage the third clutch 11, and hence no particular complicated mutual control of the first clutch 5 and the third clutch 11 is required for the upshifting. As the first clutch 5 becomes engaged, rotational power starts to be transmitted from the crankshaft 101 through the first clutch 5 and the first one way clutch 6 to the first driving gear wheel shaft 1. From the first driving gear wheel shaft 1, this rotational power is transmitted via the third speed driving gear 23 to the third speed driven gear 33 engaged therewith which transmits said rotation via the splines 53 and the first/third synchronizer 50 engaged thereto to the first driven gear wheel shaft 3, which rotates the power output gear wheel 36, thus transmitting output rotational power to the differential gear mechanism 37; and at this time automatically the second one way clutch 12 starts to run free or overrun, since as will be easily understood by one of ordinary skill in the transmission art based upon the foregoing explanation the rotational speed (in the predetermined rotational direction) of its power input member 12a now becomes less relative to the rotational speed of its power output member 12b. Accordingly no question of locking up of the transmission can occur. Thus the vehicle comes to operate in the third speed stage. At a convenient time, during steady running in the third speed stage, when it is certain that no downshift back to the second speed stage will imminently take place, the synchronizer sleeve 64 of the second/fourth synchronizer 60 may be returned to the intermediate position, so as to stop the second one way clutch 12 free wheeling and so as to preserve the life of said second one way clutch 12; and also the third clutch 11 is disengaged.

During steady running in the third speed stage in a vehicle operational condition in which upshifting to the fourth speed stage and downshifting to the second speed stage are alike inconceivable, the synchronizer sleeve 64 of the second/fourth synchronizer 60 is set to its intermediate position by said control system, so that neither the second speed driven gear wheel 32 nor the fourth speed driven gear wheel 34 is rotationally connected to the second driven gear wheel shaft 14; however, when the vehicle is operating in an operational region in which an upshift is imminent or is conceivably imminent as a preparatory action to engaging the fourth speed stage in fact the second/fourth synchronizer sleeve 64 is set to its rightwardly displaced position by the above mentioned transmission control system, so as rotationally to couple the fourth speed driven gear wheel 34 with the second driven gear wheel shaft 14. On the other hand, when the vehicle is operating in an operational region in which a downshift is possible as a preparatory action to engaging the second speed stage in fact the second/fourth synchronizer sleeve 64 is set to its leftwardly displaced position by the above mentioned transmission control system, so as rotationally to couple the second speed driven gear wheel 32 with the second driven gear wheel shaft 14. The first one of these actions (relating to upshifting) does not cause any particular operational problem, because at this time the third clutch 11 is still disengaged; and the second one of these actions which relates to the case of a downshift to the second speed stage causes no problem either, because in any case the second one way clutch 12 can operate to run free, even though as explained shortly the third clutch 11 is kept engaged.

If during running in the third speed stage, engine braking is currently required, for example when the accelerator pedal of the vehicle is released, then the second clutch 7 is engaged, while otherwise it is disengaged. If the second clutch 7 is engaged in engine overrunning condition, so as to bypass the action of the first one way clutch 6, rotational power can be transmitted in the reverse direction to the one described above via this second clutch 7 from the differential mechanism 37 to the crankshaft 101 of the internal combustion engine 100 in order to provide engine braking, and otherwise during engine overrunning condition the first one way clutch 6 runs free or overruns, thus not providing any engine braking and allowing the vehicle to free wheel or coast, in this third speed stage like in the first speed stage.

DOWNSHIFTING FROM THIRD SPEED STAGE TO SECOND SPEED STAGE

As explained above, during steady running in the third speed stage the synchronizer sleeve 64 of the second/fourth synchronizer 60 is kept at its intermediate position by said control system, so that neither the second speed driven gear wheel 32 nor the fourth speed driven gear wheel 34 is rotationally connected to the second driven gear wheel shaft 14; however, in any operational condition in which, by a kick down or the like, it is possible that the second speed stage may be downshifted to from the third speed stage, as a preparatory action to engaging the second speed stage when downshifting thereto from the third speed stage, the second/fourth synchronizer 60 is set to its leftwardly displaced position as seen in FIG. 1 by the transmission control system, so as rotationally to couple the second speed driven gear wheel 32 with the second driven gear wheel shaft 14. This will cause no particular operational problem, because at this time the third clutch 11 is still disengaged, and of course so is the fourth clutch 13. Next, also as a preparatory action, the third clutch 11 is engaged. As before, as explained above, this will cause the second one way clutch 12 to run free or overrun.

Next, in order to actually perform the downshift, which may either be during engine drive condition in the case of a kick down type downshift or may be in engine overrunning condition in the case of a reducing road speed type downshift, simply the first clutch 5 is smoothly disengaged. Since at this time the third clutch 11 is already engaged, hence no particular complicated mutual control of the first clutch 5 and the third clutch 11 is required for the downshifting. Further, the downshift is very snappy and quick.

As the first clutch 5 becomes disengaged, if this is a case of a kick down type downshift, then the rotational speed of the internal combustion engine 100 will quickly increase to a rotational speed at which the second one way clutch 12 will stop running free, so that now rotational power, transmitted from the crankshaft 101 to the second driving gear wheel shaft 2 and thence via the second speed driving gear 22 to the second speed driven gear 32 engaged therewith which transmits said rotation via the splines 62 and the second/fourth synchronizer 60 engaged thereto to the second driven gear wheel shaft 14, starts to be transmitted through the third clutch 11 and the second one way clutch 12 to the first driven gear wheel shaft 3, which rotates the power output gear wheel 36, thus transmitting output rotational power to the differential gear mechanism 37, now at a gearing ratio appropriate to the second speed stage.

On the other hand, as the first clutch 5 becomes disengaged, if this is not a case of a kick down type downshift, but is a case of a power off type downshift, then at this time automatically the second one way clutch 12 continues to run free or overrun, and the vehicle is allowed to free wheel or coast. As explained above, engine braking may be available, in the second speed stage, by subsequently engaging the fourth clutch 13.

Thus the vehicle comes to operate in the second stage. At a convenient time, during steady running in the second speed stage, the synchronizer sleeve 54 of the first/third synchronizer 50 may be returned to the intermediate position, so as to stop the first clutch 5 from slipping and so as to preserve the life of said first clutch 5.

UPSHIFTING FROM THIRD SPEED STAGE TO FOURTH SPEED STAGE

In order to shift up from the third speed stage into the fourth speed stage, first, as a preparatory action as mentioned above, the second/fourth synchronizer sleeve 64 of the second/fourth synchronizer 60 is moved to its rightwardly displaced position by the transmission control system, so as rotationally to couple the fourth speed driven gear wheel 34 with the second driven gear wheel shaft 14. No drive is yet transmitted at this time, because the third clutch 11 (and of course the fourth clutch 13) is still disengaged. Further, also as a preparatory action, the second clutch 7 is disengaged, if in fact it was previously engaged. Next, in order to actually perform the upshift, which of course will be during engine drive condition and not during an engine overrunning condition, the third clutch 11 is smoothly engaged, while keeping the second clutch 7 still disengaged. As will be shortly explained, it is not necessary yet at this time to disengaged the first clutch 5, and hence no particular complicated mutual control of the first clutch 5 and the third clutch 11 is required for the upshifting. As the third clutch 11 becomes engaged, rotational power which is being transmitted from the crankshaft 101 of the engine 100 to the second driving gear wheel shaft 2 and via the fourth speed driving gear 24 to the fourth speed drive gear 34 engaged therewith which transmits said rotational via the splines 63 and the second/fourth synchronizer 60 engaged thereto to the second driven gear wheel shaft 14 starts to be transmitted through the third clutch 11 and the second one way clutch 12 to the first driven gear wheel shaft 3, which rotates the power output gear wheel 36, thus transmitting output rotational power to the differential gear mechanism 37, now at a gearing ratio appropriate to the fourth speed stage; and at this time automatically the first one way clutch 6 starts to run free or overrun, since as will be easily understood by one of ordinary skill in the transmission art based upon the foregoing explanation the rotational speed (in the predetermined rotational direction) of its power input member 6a now becomes less relative to the rotational speed of its power output member 6b. Accordingly no question of locking up of the transmission can occur, provided that the second clutch 7 is definitely disengaged before the third clutch 11 starts to be engaged to start the upshifting. Thus the vehicle comes to operate in the fourth speed stage. At a convenient time, during steady running in the fourth speed stage, the first/third synchronizer sleeve 54 of the first/third synchronizer 50 may be returned to the intermediate position, so as to stop the first one way clutch 6 from free wheeling and so as to preserve the life of said first one way clutch 6; and also the first clutch 5 is disengaged.

If, during running in the fourth speed stage, engine braking is currently required, for example when the accelerator pedal of the vehicle is released, then the fourth cycle 13 is engaged, while otherwise it is disengaged. If the fourth clutch 13 is engaged in engine overrunning condition, so as to bypass the action of the second one way clutch 12, rotational power can be transmitted in the reverse direction to the one described above via this fourth clutch 13 from the differential mechanism 37 to the crankshaft 101 of the internal combustion engine 100 in order to provide engine braking, and otherwise during engine overrunning condition the second one way clutch 12 runs free or overruns, thus not providing any engine braking and allowing the vehicle to free wheel or coast.

Further, during steady running in the fourth speed stage in a vehicle operational condition in which downshifting to the second speed stage is inconceivable, the synchronizer sleeve 54 of the first/third synchronizer 50 is set to its intermediate position by said control system, so that neither the first speed driven gear wheel 31 nor the third speed driven gear wheel 33 is rotationally connected to the first driven gear wheel shaft 3; however, when the vehicle is operating in an operational region in which a downshift is possible, as a preparatory action to engaging the third speed stage, in fact the first/third synchronizer sleeve 54 is set to its rightwardly displaced position in FIG. 1 by the above mentioned transmission control system, so as rotationally to couple the third speed driven gear wheel 33 with the first driven gear wheel shaft 3. This action does not cause any particular operational problem, because the first one way clutch 6 can operate to run free, even though as explained shortly the first clutch 5 is kept engaged.

DOWNSHIFTING FROM FOURTH SPEED STAGE TO THIRD SPEED STAGE

During steady running in the fourth speed stage as explained above the first/third synchronizer sleeve 54 of the first/third synchronizer 50 is kept at its intermediate position by said control system, so that the third speed driven gear wheel 33 is not rotationally connected to the first driven gear wheel shaft 3; however, in any operational condition in which, by a kick down or the like, it is possible that the third speed stage may be downshifted to from the fourth speed stage, as a preparatory action to engaging the third speed stage when downshifting thereto from the fourth speed stage, the first/third synchronizer 50 is set to its rightwardly displaced position by the transmission control system, so as rotationally to couple the third speed driven gear wheel 33 with the first driven gear wheel shaft 3. This will cause no particular operational problem, because at this time the first clutch 5 is still disengaged. Next, also as a preparatory action, with of course the second clutch 7 disengaged, the first clutch 5 is engaged. As before, as explained above, this will cause the first one way clutch 6 to run free or overrun.

Next, in order to actually perform the downshift when it is required, which may either be during engine drive condition in the case of a kick down type downshift or may be in engine overrunning condition in the case of an engine braking desirable type downshift, simply the third clutch 11 is smoothly disengaged, while keeping the second clutch 7 still disengaged. Since at this time the first clutch 5 is already engaged, hence no particular complicated mutual control of the first clutch 5 and the third clutch 11 is required for the downshifting.

As the third clutch 11 becomes disengaged, if this is a case of a kick down type downshift, then the rotational speed of the internal combustion engine 100 will quickly increase to a rotational speed at which the first one way clutch 6 will stop running free, so that now rotational power starts to be transmitted from the crankshaft 101 through the first clutch 5 and the first one way clutch 6 to the first driving gear wheel shaft 1, and thence via the third speed driving gear 23 to the third speed driven gear 33 engaged therewith which transmits said rotation via the splines 52 and the first/third synchronizer 50 engaged thereto to the first driven gear wheel shaft 3, which rotates the power output gear wheel 36, thus transmitting output rotational power to the differential gear mechanism 37, now at a gearing ratio appropriate to the third speed stage.

On the other hand, as the third clutch 11 becomes disengaged, if this is not a case of a kick down type downshift, but is a case of a power off type downshift, then at this time automatically the first one way clutch 6 continues to run free or overrun, and the vehicle is allowed to free wheel or coast. Now, if engine braking is required after the downshift to the third speed stage, which typically will be the case in the case of a power off type downshift, then the bypass clutch 7 which bypasses the first one way clutch 6 is smoothly engaged, and accordingly the coasting or free running operational condition of the vehicle is quickly transformed into an engine braking condition. The ability to provide engine braking in the third speed stage is again a consequence of the provision of the bypass clutch 7, i.e. is a consequence of the capability of the first clutching assembly 4 to be locked up in both rotational directions.

Thus the vehicle comes to operate in the third speed stage. At a convenient time, during steady running in the third speed stage, the synchronizer sleeve 64 of the second/fourth synchronizer 60 may be returned to the intermediate position, so as to stop the second one way clutch 12 free wheeling and so as to preserve the life of said second one way clutch 12.

REVERSE SPEED STAGE

In the reverse speed stage, the first/third synchronizer sleeve 54 of the first/third synchronizer 50 is set to its intermediate position by the above mentioned transmission control system, the second/fourth synchronizer sleeve 64 of the second/fourth synchronizer 60 is set to its intermediate position by said control system, and the the reverse idler gear 27 is shifted in the leftwards direction along the reverse idler gear shaft 26 by the abovementioned control system via a fork or the like of a per se well known sort, so that said reverse idler gear 27 engages both with the reverse driving gear 25 fixed on the first driving gear wheel shaft 1 and also with the reverse speed drive gear 35 formed on the outside of the first/third synchronizer sleeve 54. Further, the first clutch 5 and the second clutch 7 are engaged, while the third clutch 11 and the fourth clutch 13 are disengaged. Thus, the rotation of the crankshaft 101 is transmitted via the first clutch 5 and the second clutch 7 to the first driving gear wheel shaft 1, and thence is transmitted via the reverse driving gear 25 and the reverse idler gear 27 and the reverse driven gear 35 to the first driven gear wheel shaft 3, thus rotating this first driven gear wheel shaft 3 and the power output gear wheel 36 mounted thereon in the reverse rotational sense to that rotational sense in which said members were rotated in all the other speed stages whose operation has been explained above, since one more gear wheel, the reverse idler gear 27, is involved in the rotational force transmission path. Thus reverse rotational driving power is transmitted to the differential gear mechanism 37. Thus the gear transmission mechanism functions in its reverse speed stage. The second clutch 7 is kept engaged at all times during this reverse speed stage operation, because engine braking is very important at this time, and in order to prolong the operational life of the first one way clutch 6.

SUMMARY OF THE FUNCTIONING OF THE TRANSMISSION MECHANISM

According to this above described functioning of the described transmission mechanism, as controlled according to the preferred embodiment of the transmission control method of the present invention by the preferred embodiment of the transmission control device of the present invention, during the engagement of any one of the speed stages, it is possible to prepare for the engagement of the next speed stage required, in other words to make preliminary preparations for the engagement of the next higher or the next lower speed stage. This is possible because alternate speed stages are provided by different ones of the power transmission systems between the crankshaft 101 of the internal combustion engine 100 and the output shaft of the transmission mechanism, i.e. the first driven gear wheel shaft 3, and thus the power transmission system relating to the next speed stage can be prepared for the subsequent engagement of that next speed stage (by shifting of the synchronizer sleeve relating thereto, while still the current speed stage is being engaged; and after this preparation the actual shifting between speed stages can be performed by altering the engagement conditions of the first and second clutching assemblies 4 and 9. Further, because of the provision of the first and second one way clutches 6 and 12, i.e. because these first and second clutching assemblies 4 and 9 have the function of providing one way transmission of rotational power in a certain operational mode, it is not necessary to operate the clutching assemblies 4 and 9 together in any closely related fashion, and accordingly timing problems with regard to simultaneous operation of these clutching assemblies 4 and 9 do not arise. Thus, both in the case of an upshift and in the case of a power on downshift or a so called kick down type downshift, this change between speed stages is accomplished smartly and positively, as is desirable. Further, because of the provision of the operational mode, for both the first and second clutching assemblies 4 and 9, of transmission of rotational power in both rotational directions, i.e. because of the provision of the second clutch 7 which bypasses the first one way clutch 6 and of the fourth clutch 13 which bypasses the second one way clutch 12, thus, in the case of a power off downshift or an engine braking required type downshift, engine braking is made available in those speed stages of the transmission mechanism which are provided by the power transmission systems associated with those first and second clutching assemblies 4 and 9, i.e. in all of the first through the fourth speed stages. Thus, because both of the clutching assemblies are provided with such a bypass clutch, i.e. with such a two way power transmission operational mode, engine braking is made available in all the speed stages of the transmission mechanism.

And, particularly according to the concept of the present invention, in any of the speed stages other than the first speed stage, in other words in the second speed stage, the third speed stage, and the fourth speed stage, in any vehicle operational condition in which a downshift to the next lower speed stage as by a kickdown or the like is conceivable, then the synchronizer sleeve relating to that next lower speed stage is kept engaged to the driven gear wheel for that next lower speed stage, and also the clutch relating to that next lower speed stage is kept engaged, so that the one way clutch in series with said clutch is caused to free wheel. A downshift to that next lower speed stage can then quickly be made simply by disengaging the clutch of the currently engaged speed stage, allowing the crankshaft 101 of the internal combustion engine 100 to speed up and to thus stop the aforesaid one way clutch free wheeling, thus providing a very quick and snappy downshifting capability.

THE STRUCTURE OF THE CONTROL SYSTEM

Now, the control system for the transmission mechanism which is the preferred embodiment of the transmission control device according to the present invention, which thus performs selective engagement and disengagement of the first, second, third and fourth clutches 5, 7, 11, and 13, and the movements leftwards and rightwards from their neutral positions of the first/third synchronizer sleeve 54 of the first/third synchronizer 50, of the second/fourth synchronizer sleeve 64 of the second/fourth synchronizer 60, and of the reverse idler gear 27 on the reverse idler gear shaft 26, according to the preferred embodiment of the transmission control method according to the present invention, will be described with regard to its construction and with regard to the manner in which it performs its functions.

The reference numeral 140 denotes a hydraulic fluid pressure control device, which incorporates eight electromagnetic fluid switching valves 131, 132, 133, 134, 141, 142, 143, and 144, all of which are of a per se well known sort. The details of the internal structure of this hydraulic fuid pressure control device 140 are not particularly shown because, based upon the functional descriptions of the operation thereof given in this specification, a person of ordinary skill in the transmission art will be able to supplement them without undue difficulty. According to various patterns of energization and deenergization of the solenoids or the like of the eight electromagnetic fluid switching valves 131, 132, 133, 134, 141, 142, 143 and 144, via respective signal wires 171, 172, 173, 174, 175, 176, 177 and 178, this hydraulic fluid pressure control device 140 outputs various patterns of supply and non supply of hydraulic fluid pressure to nine hydraulic fluid conduits, denoted by the reference numerals 181 through 189. The hydraulic fluid conduit 181 leads to the second clutch 7; the hydraulic fluid conduit 182 leads to the first clutch 5; the hydraulic fluid conduit 183 leads to one side of a hydraulic actuator 121 for the sleeve 54 of the first-third synchronizer 50, supply of hydraulic fluid pressure to said one side of said synchronizer 50 causing its said sleeve 54 to be shifted leftwards so as to be engaged with the splines 52 for the first speed stage provided on the first speed driven gear 31; the hydraulic fluid conduit 184 leads to the other side of said hydraulic actuator 121 for the sleeve 54 of the first-third synchronizer 50, supply of hydraulic fluid pressure to said other side of said synchronizer 50 causing said its sleeve 54 to be shifted rightwards so as to be engaged with the splines 53 for the third speed stage provided on the third speed driven gear 33; the hydraulic fluid conduit 185 leads to one side of a hydraulic actuator 120 for the sleeve 64 of the second-fourth synchronizer 60, supply of hydraulic fluid pressure to said one side of said synchronizer 60 causing its said sleeve 64 to be shifted leftwards so as to be engaged with the splines 62 for the second speed stage provided on the second speed driven gear 32; the hydraulic fluid conduit 186 leads to the other side of said hydraulic actuator for the sleeve 64 of the second-fourth synchronizer 60, supply of hydraulic fluid pressure to said other side of said synchronizer 60 causing its said sleeve 64 to be shifted rightwards so as to be engaged with the splines 63 for the fourth speed stage provided on the fourth speed driven gear 34; the hydraulic fluid conduit 187 leads to the fourth clutch 13; the hydraulic fluid conduit 188 leads to the third clutch 11; and the hydraulic fluid conduit 189 leads to an actuator (not shown) for moving the reverse speed idler gear wheel 27 on the reverse idler gear shaft 26; and thus, by providing one or another pattern of supply and non supply of hydraulic fluid pressure to the hydraulic fluid conduits 181 through 189, any required combination of engagement or disengagement of the clutches and the synchronizers and the reverse speed gear wheel 27 can be made available, thus making it possible to engage the transmission mechanism to its various speed stages in the various configurations especially with regard to upshifting and downshifting as explained earlier in this specification, and to shift between them as also explained earlier. By the way, the provision of the reverse speed stage, which is in fact made by the use of the electromagnetic fluid switching valve 134, will not be particularly discussed hereinafter because it is particularly provided and is not related to the gist of the present invention; and accordingly no further discussion of said hydraulic fluid switching valve 134 will be provided herein.

First, with regard to the operation of the clutches: in Table II, which is located at the end of this specification and before the claims appended thereto, and which is to be understood as incorporated into this specification at this point, there is shown, for each of the eight possible combinations (denoted by "A1" through "A8") of energization and deenergization of the solenoids or the like of the three electromagnetic fluid switching valves 131, 132, and 133 which relate to the operation of the first, second, third and fourth clutches 5, 7, 11, and 13, the engagement conditions of these four clutches. This function is provided by internal hydraulic circuits within the hydraulic fluid pressure control device 140 which are not particularly detailed in this specification, because, based upon the functional descriptions of the operation thereof given in this specification, a person of ordinary skill in the transmission art will be able to supplement them without undue difficulty. In this Table, the symbol "P" indicates that the corresponding electromagnetic fluid switching valve is supplied with actuating electrical energy, and the symbol "O" indicates that the corresponding electromagnetic fluid switching valve is not supplied with actuating electrical energy; while the symbol "E" indicates that the corresponding clutch is engaged, and the symbol "D" indicates that the corresponding clutch is disengaged. The electrical signals for controlling these three electromagnetic fluid pressure switching valves 131, 132, and 133, and for controlling the reverse speed stage engagement electromagnetic fluid switching valve 134, are dispatched thereto respectively via four signal wires 171, 172, 173, and 174. This concept of operating four clutches with the use of only three electromagnetic switching valves is particularly helpful with regard to the design objectives of minimizing cost, weight, bulk, and complexity of the transmission, and is possible because, according to the function of the transmission as described above, in fact only these eight different possible combinations of connection and disconnection of the clutches are required.

Next, with regard to the operation of the synchronizers: in fact, respectively, each of the four electromagnetic fluid switching valves 141, 142, 143, and 144 which relate to the leftwards and rightwards operation of the synchronizer sleeves 54 and 64 directly controls supply or non supply of hydraulic fluid pressure via the corresponding one of the hydraulic fluid conduits 175, 176, 177, and 178 to a respective pressure chamber of a respective hydraulic actuator for, respectively: rotationally engaging via the first speed stage splines 52 the first speed stage driven gear wheel 31 to the first driven gear wheel shaft 3 by shifting the synchronizer sleeve 54 of the first-third synchronizer 50 from its neutral or intermediate position to the left as seen in FIG. 1, rotationally engaging via the third speed stage splines 53 the third speed stage driven gear wheel 33 to the first driven gear wheel shaft 3 by shifting the synchronizer sleeve 54 of the first-third synchronizer 50 from its neutral or intermediate position to the right as seen in FIG. 1, rotationally engaging via the second speed stage splines 62 the second speed stage driven gear wheel 32 to the second driven gear wheel shaft 14 by shifting the synchronizer sleeve 64 of the second-fourth synchronizer 60 from its neutral or intermediate position to the left as seen in FIG. 1, and rotationally engaging via the fourth speed stage splines 63 the fourth speed stage driven gear wheel 34 to the second driven gear wheel shaft 14 by shifting the synchronizer sleeve 64 of the second-fourth synchronizer 60 from its neutral or intermediate position to the right as seen in FIG. 1. The electrical signals for controlling these four electromagnetic fluid pressure switching valves 141, 142, 143, and 144 are dispatched thereto respectively via four signal wires 175, 176, 177, and 178.

Now, the signals to the eight electromagnetic fluid switching valves 131 through 134 and 141 through 144 are provided via the signal wires 171 through 178 from an electrical control device 150, which in the typical embodiment of the transmission control system is a microcomputer. In this case, the signals to the signal wires 171 through 178 are provided from an output port device 130 of this microcomputer, which is also provided with an input port device 160; the details of the structure of such a microcomputer and such input and output port devices are per se well known in the control art and will not be further discussed herein. The microcomputer 150 receives via its said input port device 160 electrical signals relating to the current operational condition of the vehicle from various sensors, including in this preferred embodiment an electrical signal indicative of the current vehicle speed from a vehicle speed sensor 161, an electrical signal indicative of the current load on the internal combustion engine 100 (i.e., in the case of a gasoline engine, indicative of the throttle opening thereof) from an engine load sensor 162, and an electrical signal indicative of the desired transmission range (such as "P", "R", "N", "D", "3", "2", or "L") currently selected for transmission operation by the driver of the vehicle on a manual transmission range setting means. Typically, the microcomputer 150 may receive via its said input port device 160 electrical signals relating to other operational conditions of the vehicle from a knock sensor which indicates abnormal cylinder combustion conditions, a water temperature sensor which indicates the temperature of the cooling water of the internal combustion engine 100, from a vehicle altitude sensor which indicates the height above sea level at which the vehicle is being operated (i.e. the current air pressure and sea level air pressure), from a braking sensor which indicates the current braking condition of the vehicle, and possibly from other sensors; these sensors are not particularly shown in the figures.

In any case, based upon the current values of these signals from these sensors and possibly upon other information, the microcomputer 150 makes decisions, from moment to moment, as to what speed stage of the transmission mechanism shown in FIG. 1 should currently be engaged, by consideration of previously stored speed shifting patterns, as appropriately accessed and/or modified according to the output signals of the sensors, and of course by consideration of what speed stages are currently available to the transmission as set on the manual transmission range setting means by the vehicle driver; the details of such a decision as to the proper transmission speed stage to be currently engaged will not be particularly described herein because they are per se well known and conventional. Then the microcomputer 150 takes the appropriate action to output the appropriate electrical signals, via the output port device 130 and via the signal wires 171 through 178, to control the eight electromagnetic fluid switching valves 131 through 134 and 141 through 144 to so actuate the various clutches and synchronizers as to provide said decided upon speed stage—possibly by performing an upshift or a downshift, if required.

Figure 2:
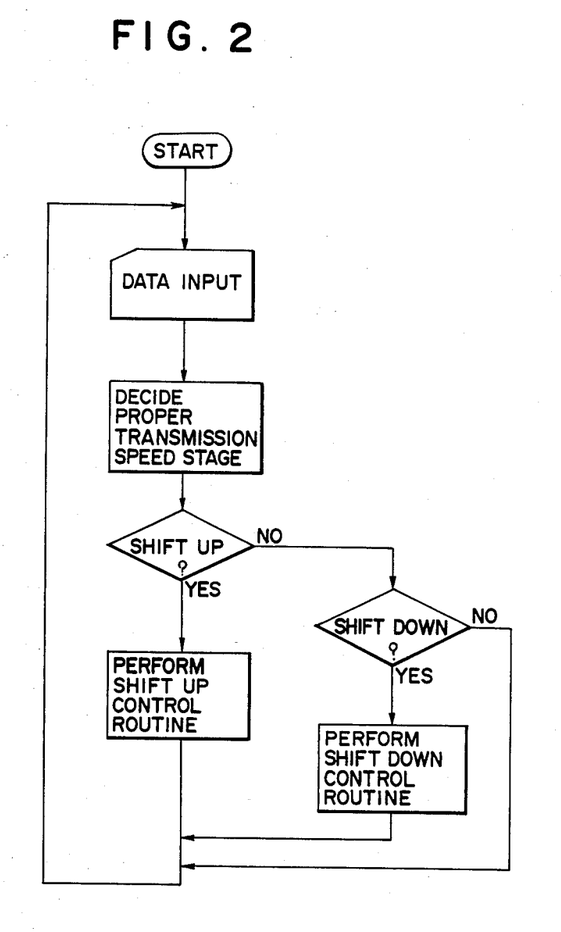
FIG. 2 is a flow chart of a program stored in and used for controlling the operation of a computer incorporated in the transmission control system shown in FIG. 1.

In more detail, the microcomputer 150 repeatedly executes a program stored in its memory (i.e. in ROM) at high speed, and the flow chart of the upper level of this program (or rather of a part of it which is used in the case that the "D" range is set by the driver of the vehicle on the manual range setting means so that the vehicle is to be operated by using all of the first through the fourth speed stages) is shown in FIG. 2. This program is in fact written in a computer language or in object code appropriate to the particular microcomputer used, but the intimate details thereof will not be explored herein because, based upon the disclosure herein, they can be supplemented without difficulty in a form suited to any particular implementation by one of ordinary skill in the art without undue difficulty. This flow chart will now be explained in outline.

First, when the vehicle is first started up, control enters the START block. In this START block, the microcomputer 150 initializes the various workspaces and so on in its RAM, and prepares for operation. Then control passes to enter next the DATA INPUT block.

Next, in the DATA INPUT block, the microcomputer 150 inputs the current values of the electrical signals from the various sensors, including a signal representative of the current value of vehicle speed from the vehicle speed sensor 161, a signal representative of the current value of load on the internal combustion engine 100 from the engine load sensor 162, a signal representative of the currently selected transmission range on the manual transmission range setting means (here assumed in fact to be the "D" range) from the manual range position sensor 163, a signal representative of the current engine knocking condition from the knock sensor (not shown), a signal representative of the current temperature of the cooling water of the internal combustion engine 100 from the engine water temperature sensor (not shown), a signal representative of the current operational altitude of the vehicle from the altitude sensor (not shown), a signal representative of the current braking condition of the vehicle from the braking sensor (not shown), and so on, via the input port device 160, and stores digital values representative thereof in RAM. Then control passes to enter next the DECIDE PROPER TRANSMISSION SPEED STAGE block.

In this DECIDE PROPER TRANSMISSION SPEED STAGE block, as outlined above, the microcomputer 150 (or rather the program resident therein in ROM) decides, based upon the current values of these signals from these sensors, which is the proper speed stage for the transmission mechanism to be currently set to, upon consideration of various predetermined shift pattern diagrams stored in ROM, or the like. The details of this decision process are per se conventional. Then control passes to enter next the SHIFT UP? decision block.

In this SHIFT UP? decision block, a decision is made as to whether the actually engaged transmission speed stage (which is of course known to the program of the microcomputer 150) is one below the desired or proper speed stage of the transmission, as decided just previously in the DECIDE PROPER TRANSMISSION SPEED STAGE block, or not. In such a case, of course a shift up by one speed stage is currently called for. Thus, this SHIFT UP? decision block serves to decide whether an upshift by one speed stage should be performed, or not. If the result of the decision in this SHIFT UP? decision block is NO, i.e. if an upshift is not currently required, then the flow of control passes to enter next the SHIFT DOWN? decision block, and otherwise if the result of the decision in this SHIFT UP? decision block is YES, i.e. if an upshift is currently required, then the flow of control passes to enter next the PERFORM SHIFT UP CONTROL ROUTINE block.

In the NO branch from this SHIFT UP? decision block, since it is decided at this point that an upshift is not proper, thus next a downshift must be tested for, and therefore at this point the flow of control passes to enter next the SHIFT DOWN? decision block.

In this SHIFT DOWN? decision block, a decision is made as to whether the actually engaged transmission speed stage (which is of course known to the program of the microcomputer 150) is one above the desired or proper speed stage of the transmission, as decided previously in the DECIDE PROPER TRANSMISSION SPEED STAGE block, or not. In such a case, of course a shift down by one speed stage is currently called for. Thus, this SHIFT DOWN? decision block serves to decide whether a downshift by one speed stage should be performed, or not. If the result of the decision in this SHIFT DOWN? decision block is NO, i.e. if a downshift is not currently required, then the flow of control passes back to the earlier part of the flow chart, to again enter next the DATA INPUT block, and otherwise if the result of the decision in this SHIFT DOWN? decision block is YES, i.e. if a downshift is currently required, then the flow of control passes to enter next the PERFORM SHIFT DOWN CONTROL ROUTINE block.

Thus, in the NO branch from this SHIFT DOWN? decision block, since it is decided at this point that the transmission needs neither to be shifted up nor down, therefore at this point the microcomputer 150 recycles to again input data from the sensors in its next operational cycle. Therefore, the flow of control passes to enter next the DATA INPUT block.

On the other hand, in the YES branch from this SHIFT DOWN? decision block, since it is decided at this point that it is required to shift down the transmission by one speed stage, and therefore at this point this shifting operation should be performed, the flow of control passes to enter next the PERFORM SHIFT DOWN CONTROL ROUTINE block.

In this PERFORM SHIFT DOWN CONTROL ROUTINE block, control is passed to a subroutine which will not be particularly detailed herein, which actually performs the operations relative to downshifting the transmission, by outputting the appropriate electrical signals, via the output port device 130 and via the signal wires 171 through 178, to appropriately control the eight electromagnetic fluid switching valves 131 through 134 and 141 through 144 to so actuate the various clutches and synchronizers as to downshift the transmission by one speed stage to the desired speed stage as earlier determined by the DECIDE PROPER TRANSMISSION SPEED STAGE block. Based upon the descriptions of the required actuations and actuation sequences of the various clutches and synchronizers, as described earlier in this specification, the details of this control routine will be clear to one of ordinary skill in the transmission art. Particularly, since as explained earlier the synchronizer sleeve relating to that next lower speed stage is already being kept engaged to the driven gear wheel for that next lower stage, and also the clutch relating to that next lower speed stage is already being kept engaged so that the one way clutch in series with said clutch is caused to free wheel, the downshift to that next lower speed stage can in fact quickly be made simply by disengaging the clutch of the currently engaged speed stage, allowing the crankshaft 101 of the internal combustion engine 100 to speed up and to thus stop the aforesaid one way clutch free wheeling, thus providing a very quick and snappy downshifting capability which is especially responsive during a kick down type downshift when quick vehicle acceleration is required. From this PERFORM SHIFT DOWN CONTROL ROUTINE block, the flow of control passes to enter next the DATA INPUT block, and the microcomputer 150 recycles to again input data from the sensors in its next operational cycle.

On the other hand, in the YES branch from the SHIFT UP? decision block, since it is decided at this point that it is required to shift up the transmission by one speed stage, and therefore at this point this shifting operation should be performed, the flow of control passes to enter next the PERFORM SHIFT UP CONTROL ROUTINE block.

In this PERFORM SHIFT UP CONTROL ROUTINE block, control is passed to another subroutine which will not be particularly detailed herein, which actually performs the operations relative to upshifting the transmission, again by outputting the appropriate electrical signals, via the output port device 130 and via the signal wires 171 through 178, to appropriately control the eight electromagnetic fluid switching valves 131 through 134 and 141 through 144 to so actuate the various clutches and synchronizers as to upshift the transmission by one speed stage to the desired speed stage as earlier determined by the DECIDE PROPER TRANSMISSION SPEED STAGE block. Particularly, since as explained earlier the synchronizer sleeve relating to that next higher speed stage is already being kept engaged to the driven gear wheel for that next higher speed stage, the upshift to that next higher speed stage can in fact quickly be made simply by engaging the clutch of that next higher speed stage, which will cause the one way clutch associated with the current speed stage to start to free wheel and will cause the crankshaft 101 of the internal combustion engine 100 to slow down as the next higher speed stage is engaged and takes over power transmission. Thus a very smooth upshifting capability is provided without requiring delicate timing interrelation between the clutches. Again, based upon the descriptions of the required actuations and actuation sequences of the various clutches and synchronizers, as described earlier in this specification, the details of this control routine will be clear to one of ordinary skill in the transmission art. From this PERFORM SHIFT UP CONTROL ROUTINE block, the flow of control passes to enter next the DATA INPUT block, and the microcomputer 150 recycles to again input data from the sensors in its next operational cycle.

According to the method of the present invention, during the engagement of a particular one of the speed stages other than the first speed stage, i.e. while the one of said clutching mechanisms 4 and 9 associated with the one of the power transmission systems between the crankshaft 101 of the internal combustion engine 100 and the power output gear wheel 36 which provides said particular speed stage is engaged to provide direct transmission of rotational power in the driving rotational direction, then the other one of the clutching mechanisms 4 and 9 associated with the other one of said power transmission systems is also kept engaged to provide direct transmission of rotational power in the driving rotational direction only, and will as a matter of course be freewheeling, as explained above in detail. When it is desired to shift the transmission down from said particular speed stage to the speed stage which is one lower than said particular speed stage, then it is only necessary to disengage said one of said clutching mechanisms 4 and 9 which is associated with said first one of said power transmission systems, and then the crankshaft 101 of the internal combustion engine 100 and the power output gear wheel 36 will remain as engaged together by said second one of said power transmission systems, and, in the case that this is a power on shift down or a so called kick down, the crankshaft 101 will quickly speed up so as to drive the power output gear wheel 36, now at a gearing ratio appropriate to said speed stage which is one speed stage lower than said particular speed stage. This shift down is thus performed very snappily and smoothly and quickly, just by disengaging said particular clutching mechanism associated with said second one of said power transmission systems; and accordingly good vehicle acceleration and good drivability and transmission operational feeling are provided. Further, because the second one of said power transmission systems which is for providing the speed stage of said transmission mechanism which is one speed stage lower than said particular speed stage is kept also individually connected in parallel with said first one of said power transmission systems, i.e. is kept engaged so as to be able to provide direct transmission of rotational power in said one rotational direction only and to freewheel in the other rotational direction, substantially always while a shift down is operationally possible during the engagement of said certain speed stage of said transmission mechanism, thereby the transmission is kept ready for a quick downshift, substantially always while such a downshift is operationally envisageable. Thus quick vehicle acceleration is available at any time by a kick down process, with particularly snappy and responsive transmission shifting down action. And according to the device of the present invention this method of the present invention may be conveniently carried out by an economical and simple mechanism.

Although the present invention has been shown and described with reference to a preferred embodiment of the method and a preferred embodiment of the device thereof, and in terms of the illustrative drawings, it should not be considered as limited thereby. Various possible modifications, omissions, and alterations could be conceived of by one skilled in the art to the form and the content of this preferred embodiment, without departing from the scope of the present invention. Therefore it is desired that the scope of the present invention, and of the protection sought to be granted by Letters Patent, should be defined not by any of the perhaps purely fortuitous details of the shown preferred embodiment, or of the drawings, but solely by the scope of the appended claims, which follow.

TABLE I

| ASSEMBLY | SPEED STAGE | 1 | 2 | 3 | 4 | R |
|---|---|---|---|---|---|---|
| 4 | CLUTCH 5 | E | D/e | E | D/e | E |
|   | ONE WAY CLUTCH 6 | A | O | A | O | A |
|   | CLUTCH 7 | B | D | B | D | B |
| 9 | CLUTCH 11 | D/e | E | D/e | E | D/e |
|   | ONE WAY CLUTCH 12 | O | A | O | A | O |
|   | CLUTCH 13 | D | B | D | B | D |
| 50 | SPLINES 52 | E | D/e | D | D | D |
|   | SPLINES 53 | D | D/e | E | D/e | D |
| 60 | SPLINES 62 | D/e | E | D/e | D | D |
|   | SPLINES 63 | D | D | D/e | E | D |

TABLE II

| CASE | A1 | A2 | A3 | A4 | A5 | A6 | A7 | A8 |
|---|---|---|---|---|---|---|---|---|
| CLUTCH 5 | D | E | E | E | D | D | E | E |
| CLUTCH 7 | D | D | E | E | D | D | D | D |
| CLUTCH 11 | D | D | E | D | E | E | E | E |
| CLUTCH 13 | D | D | D | D | E | D | D | E |
| VALVE 131 | P | P | P | P | O | O | O | O |
| VALVE 132 | P | P | O | O | P | P | O | O |
| VALVE 133 | P | O | O | P | P | P | O | O |

What is claimed is:

1. A transmission for a vehicle, comprising a transmission mechanism, and an automatic control device;

said transmission mechanism comprising: an input shaft; an output shaft, a first on-off clutch; a second on-off clutch; a first one way clutch; a second one way clutch; a first gear train having a first reduction gear ratio; a second gear train having a second reduction gear ratio smaller than said first reduction gear ratio; a third gear train having a third reduction gear ratio smaller than said second reduction gear ratio; a fourth gear train having a fourth reduction gear ratio smaller than said third reduction gear ratio; a first synchronizer which connects said input shaft and said output shaft via a series connection of said first on-off clutch, said first one way clutch, and said first gear train when said first synchronizer is shifted to a first side of a neutral position thereof so as to transmit rotational power from said input shaft to said output shaft in a normal rotational direction at a first speed stage and which connects said input shaft and said output shaft via series connection of said first on-off clutch, said first one way clutch, and said third gear train when said first synchronizer is shifted to a second side of said neutral position so as to transmit rotational power from said input shaft to said output shaft in said normal rotational direction at a third speed stage; and a second synchronizer which connects said input shaft and said output shaft via a series connection of said second on-off clutch, said second one way clutch, and said second gear train when said second synchronizer is shifted to a first side of a neutral position thereof so as to transmit rotational power from said input shaft to said output shaft in said normal rotational direction at a second speed stage and which connects said input shaft and output shaft via a series connection of said second on-off clutch, said second one way clutch, and said fourth gear train when said second synchronizer is shifted to a second side of said neutral position of said second synchronizer so as to transmit rotational power from said input shaft to said output shaft in said normal rotational direction at a fourth speed stage;

said automatic control device comprising: a vehicle speed sensor, an engine load sensor, a manual range position sensor, an electrical control device, a hydraulic control device including a plurality of electromagnetic fluid switching valves for controlling engagement and disengagement of said first and second on-off clutches and shifting of said first and second synchronizers between said respective first and second sides of said respective neutral positions, said electrical control device receiving input signals with respect to vehicle speed, engine load and manual range position from said vehicle speed sensor, said engine load sensor and said manual range position sensor, respectively, calculating shift stages to be accomplished at each predetermined moment in operation of said transmission based upon said three input signals, and dispatching output electrical signals to selected one or more of said plurality of electromagnetic fluid switching valve according to the results of said calculation, so as to accomplish said shift stages to be accomplished at each predetermined moment, said automatic control device shifting said transmission mechanism up from operation at said third speed stage to operation at said fourth speed stage by firstly disengaging said second on-off clutch, secondly shifting said second synchronizer to said second side of said neutral position thereof, and thirdly reengaging said second on-off clutch with said first on-off clutch being kept as engaged and with said first synchronizer being also kept as shifted to said second side of said neutral position thereof; and shifting said transmission mechanism down from operation at said fourth speed stage to operation at said third speed stage by firstly disengaging said second on-off clutch, and secondly shifting said second synchronizer to said first side of said neutral position thereof.

2. A transmission according to claim 1, wherein said transmission mechanism further comprises a third on-off clutch arranged in parallel with said first one way clutch, and wherein said hydraulic control device includes such an electromagnetic fluid switching valve that controls engagement and disengagement of said third on-off clutch according to said output electrical signals from said electrical control device.

3. A transmission according to claim 1, wherein said transmission mechanism further comprises a third on-off clutch arranged in parallel with said second one way clutch, and wherein said hydraulic control device includes such an electromagnetic fluid switching valve that controls engagement and disengagement of said third on-off clutch according to said output electrical signals from said electrical control device.

4. A transmission according to claim 1, wherein said transmission mechanism further comprises a third on-off clutch arranged in parallel with said first one way clutch, and a fourth on-off clutch arranged in parallel with said second one way clutch, and wherein said hydraulic control device includes such two electromagnetic fluid switching valve that control engagement and disengagement of said third and fourth on-off clutches, respectively, according to said output electrical signals from said electrical control device.

* * * * *